United States Patent
Kohda et al.

(10) Patent No.: US 6,751,656 B2
(45) Date of Patent: *Jun. 15, 2004

(54) APPARATUS AND METHOD FOR PROVIDING INFORMATION ABOUT TWO-WAY COMPUTER COMMUNICATION SERVICES

(75) Inventors: Youji Kohda, Kobe (JP); Kazuki Matsui, Akashi (JP); Kenichi Sasaki, Akashi (JP); Ryuichi Matsukura, Kobe (JP); Yasuhide Matsumoto, Akashi (JP); Iwao Otsuka, Akashi (JP); Akihiko Obata, Kobe (JP); Makoto Okada, Fukuoka (JP); Satoshi Okuyama, Kobe (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/810,181

(22) Filed: Mar. 19, 2001

(65) Prior Publication Data

US 2001/0011299 A1 Aug. 2, 2001

Related U.S. Application Data

(63) Continuation of application No. 09/165,128, filed on Oct. 2, 1998, now Pat. No. 6,249,806.

(30) Foreign Application Priority Data

Apr. 3, 1998 (JP) .............................................. 10-91431

(51) Int. Cl.[7] .............................................. G06F 13/00
(52) U.S. Cl. ........................ 709/219; 709/224; 719/329
(58) Field of Search .................................. 709/204, 205, 709/206, 217, 219, 223, 328, 329, 224; 719/329

(56) References Cited

U.S. PATENT DOCUMENTS

| | | | |
|---|---|---|---|
| 5,713,027 A | | 1/1998 | Soejima et al. |
| 5,754,939 A | * | 5/1998 | Herz et al. .................... 455/4.2 |
| 5,764,916 A | * | 6/1998 | Busey et al. ................. 709/227 |
| 5,778,187 A | * | 7/1998 | Monteiro et al. ........... 709/231 |
| 5,828,839 A | * | 10/1998 | Moncreiff .................... 709/204 |
| 5,907,677 A | * | 5/1999 | Glenn et al. ................ 345/330 |
| 5,956,491 A | * | 9/1999 | Marks ........................ 709/250 |
| 6,020,884 A | | 2/2000 | MacNaughton et al. |
| 6,049,823 A | * | 4/2000 | Hwang ........................ 709/218 |
| 6,081,830 A | * | 6/2000 | Schindler .................... 709/204 |
| 6,370,563 B2 | * | 4/2002 | Murakami et al. .......... 709/205 |

OTHER PUBLICATIONS

Patent Abstracts of Japan, H6–086279, Mar. 25, 1994.

Patent Abstracts of Japan, H9–261609, Oct. 3, 1997.

* cited by examiner

Primary Examiner—Viet D. Vu
(74) Attorney, Agent, or Firm—Staas & Halsey LLP

(57) ABSTRACT

A plurality of user terminals regularly accessing Internet Relay Chat (IRC) services are also in communication with a service selecting host. The service selecting host is configured to collect data from the plurality of user terminals. The collected data includes information about the users at the user terminals and information about the user terminals activity in the accessing of the IRC services. The service selecting host compiles and sorts the collected data concerning IRC services to produce information provided to the user terminals. The information provided to the user terminals allows users at the user terminals to more easily select sorted IRC services.

5 Claims, 9 Drawing Sheets

Fig.3

| SUBJECT | CHANNEL NUMBER | SERVICE NAME |
|---|---|---|
| * | Normal 1 | Current Event Chat |
| * | Normal 2 | Sports Chat |
| * | Normal 3 | Weather Chat |
| * | Normal 4 | Movie Chat |
| * | Normal 5 | Movie Chat |
| * | Special 1 | Sports Chat |
| Male in early 20's | Special 2 | Weather Chat |
| Single in 30's | Special 2 | Sports Chat |
| Kobe City | Special 3 | Movie Chat |
| Suburb | Special 3 | Current Event Chat |

Fig.4

Channel List Example

| | CHANNEL NAME | NUMBER OF USERS | TOPIC |
|---|---|---|---|
| NORMAL NAME | ○ ○ ○ | 14 | × × × × |
| | △ △ △ | 2 | ○×○× |
| | ⋮ | ⋮ | ⋮ |
| SPECIAL CHANNEL | Most popular | | |
| | Same generation | | |
| | Same region | | |
| | ⋮ | | |

Fig.9

| SUBJECT | CHANNEL NUMBER | SURVICE NAME |
|---|---|---|
| * | Normal 1 | Current Event Chat |
| * | Normal 2 | Sports Chat |
| * | Normal 3 | Weather Chat |
| * | Normal 4 | Movie Chat |
| * | Normal 5 | Movie Chat |
| * | Special 1 | Current Event Chat |
| Male in early 20's | Special 2 | Movie Chat |
| Single in 30's | Special 2 | Sports Chat |
| Kobe City | Special 3 | Movie Chat |
| Suburb | Special 3 | Weather Chat | ns
APPARATUS AND METHOD FOR PROVIDING INFORMATION ABOUT TWO-WAY COMPUTER COMMUNICATION SERVICES

This application is a continuation of Ser. No. 09/165,128 filed on Oct. 2, 1998, now U.S. Pat. No. 6,249,806.

BACKGROUND OF THE INVENTION

A. Field of the Invention

The present invention generally relates to a service providing apparatus for identifying a desirable service to be provided to a user from a large number of provided services such as broadcasting programs in a cable television (CATV), an interactive television and the Internet Relay Chat (IRC), and to a service receiving apparatus, a service providing host, a computer-readable recording medium for storing a selected-service receiving program, a computer-readable recording medium for storing a selected-service transmitting program, a service selecting method in a service receiving apparatus, and a method for transmitting a selected service in a service providing host.

More specifically, the present invention is directed to a service providing apparatus that is configured to select a service to be provided based on service utilization information of a plurality of users, a service receiving apparatus, a service providing host, a computer-readable recording medium for storing a selected-service receiving program, a computer-readable recording medium for storing a selected-service transmitting program, a service selecting method in a service receiving apparatus, and also to a method for transmitting a selected service in a service providing host.

B. Description of the Related Art

Conventionally, various services such as broadcasting programs of a CATV, and open channels for IRC are available for accessing and are typically selected directly by users. However, there are many services available, specifically, there are hundreds of open channels found in IRC and therefore, it is difficult for individual users to select desirable services. In particular, when first attempting to use such services, users have an extremely difficult time learning about even the most basic of the services available. This problem is especially acute when attempting to use IRC. The reasons for such problems are easy to understand. In the CATV, since the programs are determined before broadcasting the programs, the users may obtain information concerning programming by referring to a program table in order to select desirable programs. On the other hand, with reference to IRC, there are no such program listings available which reveal the contents of conversations in the IRC programs, even when the main subjects on open channels are pre-determined in advance.

To solve the above-described difficulties which occur when a user attempts to select a service, for example, Japanese Unexamined Patent Application Laid-Open No. Hei 6-86279 discloses a home terminal system for CAM This CATV home terminal system allows the services to be classified according to the contents thereof and the users to designate the classification, so that the number of services displayed on the screen will be reduced. Also, Japanese Patent Application Laid-Open No. Hei 9-261609 discloses transmitting apparatus, receiving apparatus, and transmission/reception system for broadcasting program, in which the audience rating of programmed services is displayed, and the number of services is reduced to display on the screen in an order based upon increasing audience ratings. Furthermore, another system has been proposed, in which, while using specific phrases and theme music concerning in the contents of the services to be provided, specific services are selected from a large number of services, on behalf of users, and then the selected specific services are displayed on the screen. For instance, there is a system which allows a user to designate a keyword appearing in an open channel of IRC and produce a list of channels which include this keyword on the display screen.

However, in such the systems as described in Japanese Patent Application Laid-Open No. Hei 6-86279 and Japanese Patent Application Laid-Open No. Hei 9-261609, when the users attempt to select desirable services, the number of services which will be displayed on the screen is slightly reduced so as to make the selection task a little easier. Further, in the conventional system where a keyword is designated the users, the users will have no chance to learn about such services that fall outside of the designated keyword.

SUMMARY OF THE INVENTION

The present invention has been made to solve the above-described problems, and therefore, has an object to provide a service providing apparatus, service receiving apparatus, a service providing host, a computer-readable recording medium for recording a selected-service receiving program, a computer-readable recording medium for recording a selected-service transmitting program, a service selecting method employed in the service receiving apparatus, and a method for transmitting a selected service in a service providing host, capable of selecting a desirable service from a large number of services, on behalf of a user, in order that the user can effectively access a service that has compatible information, and moreover the user can access all of the available services with little difficulty.

In accordance with one aspect of the present invention, an information service includes a host and a plurality of receiving apparatuses connected to the host via a communication network. The receiving apparatuses is configured to request service information from the host and the host is configured to provide the service information in response to the request. The plurality of receiving apparatuses include a storage means for storing selection information relating to at least one separate service, selected service data and user data sets. A transmission means transmits the user data set and the selection information to the host. A receiving means receives the response from the host. The host includes a means for compiling and sorting the selection information to produce service utilization information based on the user data sets sent from the plurality of receiving apparatuses. A service selection means produces a list of selected services to be provided to the plurality of receiving apparatuses based on the service utilization information and the selection information. A response means transmits to the receiving apparatuses the service information where the service information is derived from the list of selected services.

Preferably, the host further includes an address database which includes a plurality of addresses. The addresses correspond to storage locations of a plurality of corresponding separate services including services on the list of selected separate services. The host also includes an address reading means for reading the plurality of addresses, identifying and reading each of the addresses corresponding to each separate service of the list of selected separate services.

Preferably, in each of the plurality of receiving apparatuses, the user data set further includes data relating to a corresponding one of the plurality of receiving apparatuses, data relating to user attributes, and data relating to utilization place.

In accordance with another aspect of the present invention, a receiving apparatus is configured for connection to an information service and at least one of a plurality of separate services, where the information service provides information about the plurality of separate services, the information service including a host for providing the information service in response to a request from the receiving apparatus. Further, a plurality of the receiving apparatuses are connected to the host via a communication network. The receiving apparatus includes an input means for inputting selection information relating to at least one of the separate services. A storage means stores the service selection information and a user data set containing a selected service data. A transmission means transmits the user data set and the selection information to the host and transmits a request to the host for the information service. A reception means receives from the host the information service.

Preferably, the storage means is further configured to store service selection information identifying at least one of the separate services accessed by the receiving apparatus. As well, the receiving apparatus includes a display means for displaying the service selection information stored in the storage means.

In accordance with yet another aspect of the present invention, a service providing host provides an information service to a plurality of receiving apparatuses connected to the host via a communication network. The receiving apparatuses are configured to connect to at least one of a plurality of separate services, where the information service provides information about the plurality of separate services. The host is configured to provide the information service in response to a request from any one of the receiving apparatuses. The host includes a reception means receiving from the plurality of receiving apparatuses predetermined user data sets and selection information relating to at least one of the separate services. A compiling means collects received ones of the user data sets and the selection information. A storage means stores the user data sets and the selection information and a compiling means searches and sorts the user data sets and the selection information in order to produce service utilization information. The service utilization information includes sorted information regarding usage of the separate services by the receiving apparatuses and sorted information from the user data sets. A service selecting means selects at least one of the separate services for each individual receiving apparatus based upon commonality between data in the service utilization information and data in the user data sets and the selection information transmitted from the individual receiving apparatus. A response means transmits identification of a selected one of the separate services to the receiving apparatuses.

Preferably, the present invention includes an address database into which addresses identifying storage location of each of the separate services is recorded and also includes an address reading means for reading an address of the selected one of the separate services selected by the service selecting means.

In accordance with yet another aspect of the present invention, a computer-readable recording medium has recorded thereon a selected service receiving program used in a receiving apparatus connected via a communication network to a host. The host provides an information service in response to a request sent from the receiving apparatus. The selected service receiving program is configured to perform the following steps within the receiving apparatus A) transmitting a user data set containing a selected service data to the host in response to passage of a predetermined time intervals;

B) transmitting to the host selection information which includes identification of at least one of a plurality of separate services accessed by the receiving apparatus;

C) receiving a response from the host, the response including information related to at least one of the plurality of separate services, the at least one of the plurality of separate services selected by the host based upon sorting of a plurality of compiled ones of the user data sets and the selection information; and D) receiving a response from the host in response to a newly selected one of the plurality of separate services being identified by the host.

Preferably, the user data set further includes data identifying a corresponding one of the receiving apparatus, data corresponding to user attributes and data corresponding to a utilization place.

Preferably, the selected service receiving program further performs the steps of:

receiving from the host service selection information relating to a plurality of identified ones of the separate services; and means for selecting any one of identified ones of the separate services.

In accordance with another aspect of the present invention, a computer-readable recording medium has recorded thereon a selected service receiving program, used in a receiving apparatus connected via a communication network to a host for providing an information service in response to a request from the receiving apparatus. The selected service receiving program is configured to perform the following steps:

A) transmitting a user data set containing a selected service data to the host at predetermined time intervals;

B) transmitting to the host selection information relating to a separate service in response to the receiving apparatus selecting the separate service;

C) receiving and storing from the host an address of a second separate service in response to selection by the host of the second separate service, selection of the second separate service by the host based upon sorting and searching a compilation of a plurality of the user data sets and the selection information; and D) receiving a new address of the second separate service in response to identification by the host of a change in the address.

Preferably, the user data set further includes: data identifying a corresponding one of the receiving apparatus, data corresponding to user attributes and data corresponding to a utilization place.

Preferably, the selected service receiving program further performs the steps of:

receiving from the host service selection information relating to a plurality of identified ones of the separate services; and means for selecting one of the separate services.

In accordance with still another aspect of the present invention, a computer-readable recording medium stores thereon a selected service transmitting program used in a host for providing a variety of separate services to a plurality of receiving apparatuses connected via a communication network. The selected service transmitting program is configured to conduct the steps of:

A) receiving predetermined user data sets containing selected service data from the plurality of receiving apparatuses within a predetermined time interval;

B) receiving service selection information from at least one of the plurality of receiving apparatuses;

C) compiling and sorting service utilization information based upon received data from the user data sets;

D) selecting appropriate separate services to be provided to the receiving apparatuses based upon the service utilization information and the service selection information; and E) transmitting to the receiving apparatuses information identifying the appropriate separate services to the receiving apparatuses.

Preferably, the selected service transmitting program is further configured to perform the steps of:

receiving the user data sets, where the user data sets include data identifying a corresponding one of the receiving apparatuses and data related to user attributes; and determining whether the user data set has been previously received from the same receiving apparatus within the predetermined time and in response to a determination that the user data set has not been previously received, the user data set is added to the service utilization information in the compiling and sorting step.

In accordance with still another aspect of the present invention, a computer-readable recording medium stores thereon a selected service transmitting program used in a host for providing a variety of separate services to a plurality of receiving apparatuses connected via a communication network. The selected service transmitting program is configured to perform the following steps:

A) providing an address database into which storage positions of the variety of separate services are registered in correspondence with the respective ones of the separate services;

B) receiving predetermined user data sets containing selected service data from the plurality of receiving apparatuses within predetermined time period;

C) receiving a service selection information from any one of the plurality of receiving apparatuses;

D) compiling and sorting service utilization information based upon information in the user data sets;

E) selecting the separate services to be provided to the receiving apparatuses based upon comparisons between the service utilization information and the received service selection information;

F) reading addresses from the address database, the address corresponding to the separate services selected in the selecting step; and G) transmitting the address to the receiving apparatuses.

Preferably, the selection service transmitting program is further configured to conduct the steps of:

receiving from at least one of the receiving apparatuses selection information corresponding to a separate service selected by the at least one of the receiving apparatuses.

Preferably, the service utilization information is compiled and sorted based upon data relating to the separate services and the plurality of receiving apparatuses.

Preferably, the user data set further contains data identifying a corresponding one of the receiving apparatuses, and the selected service transmitting program is further configured such that in response to receiving duplicate sets of the user data set, only one of the duplicate sets of the user data set is compiled into the service utilization information and sorted based upon the data identifying the corresponding one of the receiving apparatuses.

Preferably, the user data set further contains data corresponding to one of the receiving apparatus and data relating to user attributes, and the selected service transmitting program is further configured such that in response to receiving duplicate sets of the user data set, only one of the duplicate sets of the user data set is compiled into the service utilization information and sorted based upon the data corresponding to the receiving apparatus and data corresponding to the user attribute.

Preferably, the user data set further includes data corresponding to utilization place, utilization frequencies and user attributes, and the selected service transmitting program is further configured such that in response to receiving duplicate sets of the user data set, only one of the duplicate sets of the user data set is compiled into the service utilization information and sorted based data relating to the utilization place, the utilization frequencies and the user attributes.

In accordance with still another aspect of the present invention, there is a service selecting method for use in a plurality of receiving apparatuses in electronic communication with a host. The method coordinated by the host in response to communication with the receiving apparatuses. The receiving apparatuses are further configured to access any one of a plurality of separate services. The method comprises the steps of:

providing the host with a database identifying a plurality of the separate services accessible to the plurality of receiving apparatuses;

compiling service utilization information in the host based upon information from user data sets;

creating the selection information in the one of the receiving apparatuses;

receiving from the one of the plurality of receiving apparatuses a request for information and selection information;

selecting a group of the separate services from the service utilization information based upon a comparison of selection information and the service utilization information;

transmitting from the bast to the one of the plurality of receiving apparatuses the group of separate services selected in the selecting step;

transmitting at predetermined time intervals a user data set from the one of the receiving apparatuses to the host; and updating the service utilization information in response to receiving the user data set.

Preferably, the service selecting method further includes the step of transmitting the user data set from the one of the receiving apparatuses in response to a user selecting one of the separate services from a corresponding one of the receiving apparatuses.

Preferably, the separate services correspond to internet chat channels.

Preferably, the user data set includes information concerning user attributes.

Preferably, the user data set includes information concerning location of the one of the receiving apparatuses.

Preferably, the user data set includes information concerning the one of the receiving apparatuses Preferably, the receiving apparatuses are personal computers connected to the internet Preferably, the host is a computer connected to the internet.

Preferably, the host performs the updating step at second predetermined time intervals.

Preferably, the second predetermined time interval is greater than the predetermined time interval in the transmitting step.

In the above described aspects of the present invention, when the user data sets containing a
predetermined items are transmitted from a plurality of receiving apparatuses to a host, the host processes the utilization information of the services with respect to a predetermined item contained in the user data set. When the service selection information is transmitted from one of the plural receiving apparatuses, the host selects such a service fitted to the selection information, and then transmits the selected service to the receiving apparatus. Alternatively, data for specifying a service selected by the host, for example, a service name, and an address may be transmitted as a response. As previously explained, since the host can selectively provide such a service suitable for the user from all available services based upon the present utilization information of the services, even a user who has no specific target service can be easily provided with access to suitable services.

The present invention stores addresses of IRC and other internet services. Therefore, such services can be easily identified by a user since the present invention includes stored addresses. For example, a provider of the Internet, and a provider of an interactive broadcasting program may easily be incorporated into the present invention since the stored information is regularly updated.

In the present invention, data stored in a receiving apparatus and data stored in the host are used to identify appropriate services for the receiving apparatus to access. Further, the data stored in both the receiving apparatus and the host include a great deal of information, such as user attribute which includes, for example, an age of a user, a sex thereof, and an occupation. Further, the utilization place data includes, for instance, a country to which a user belongs, a region where a user lives, and an address where a user lives are specified. The user data set with this data and the data compiled in the host provide detailed means for determining appropriate services for a user to access. Since the content of the user data set is detailed, more appropriate services can be identified for a users use.

These and other objects, features, aspects and advantages of the present invention will become more fully apparent from the following detailed description of the present invention when taken in conjunction with the accompanying drawings where like reference numerals denote corresponding parts throughout.

BRIEF DESCRIPTION OF THE DRAWINGS

For a better understanding of the present invention, reference is made of a detailed description below to be read in conjunction with the accompanying drawings, in which:

FIG. 3 is a table showing an example of a service correspondence table which-indicates a utilization information for a variety of channels of IRC in accordance with the present invention;

FIG. 4 is a table which illustrates an example of a channel list in IRC in accordance with the present invention;

FIG. 9 is a table illustrating a conceptional structural diagram of a rewritten service correspondence table.

DETAILED DESCRIPTION OF THE PREFERRED EMBODIMENTS

A description will now be made of various preferred embodiments according to the present invention. As an example, and for the sake of simplifying the description, services provided in the embodiments referred to below are services provided on the Internet Relay Chat. Further, Internet Relay Chat will be referred to hereafter as "IRC". Such IRC services, and similar services accessible via the system in accordance with the present invention, are also referred to as "separate services".

Basic Concept

Figure 1:
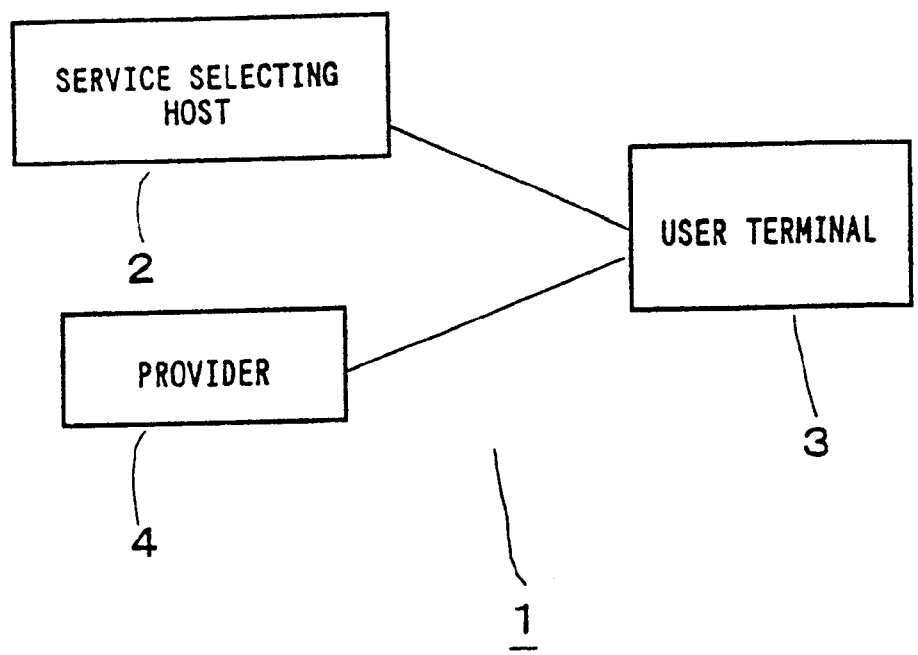
FIG. 1 is a schematic block diagram showing a basic organization of a service providing system having a service providing apparatus in accordance with an embodiment of the present invention.

A service providing system 1 shown in FIG. 1, which constitutes a basic idea of the present invention, includes a service selecting host 2, a provider 4, and a user terminal 3 connected to the service selecting host 2 and provider 4. The service selecting host 2 is configured to select separate services suitable to a user by compiling and sorting current utilization information relating to a variety of separate services, such as IRC services. The utilization information for a specific IRC may include any of a variety of data, for instance, the number of times various users log on to that specific IRC within a specified time period, demographic information and/or the specific topics discussed in the IRC, as is described in greater detail below. The user terminal 3 receives a response from the service selecting host 2 which specifies selected services and the user terminal 3 then transmits a request to the provider 4 choosing one of the selected separate services specified in the response. The provider 4 then transmits a service to the user terminal 3 in response to the request from the user, as is described in greater detail below.

Overall Arrangement

Figure 2:
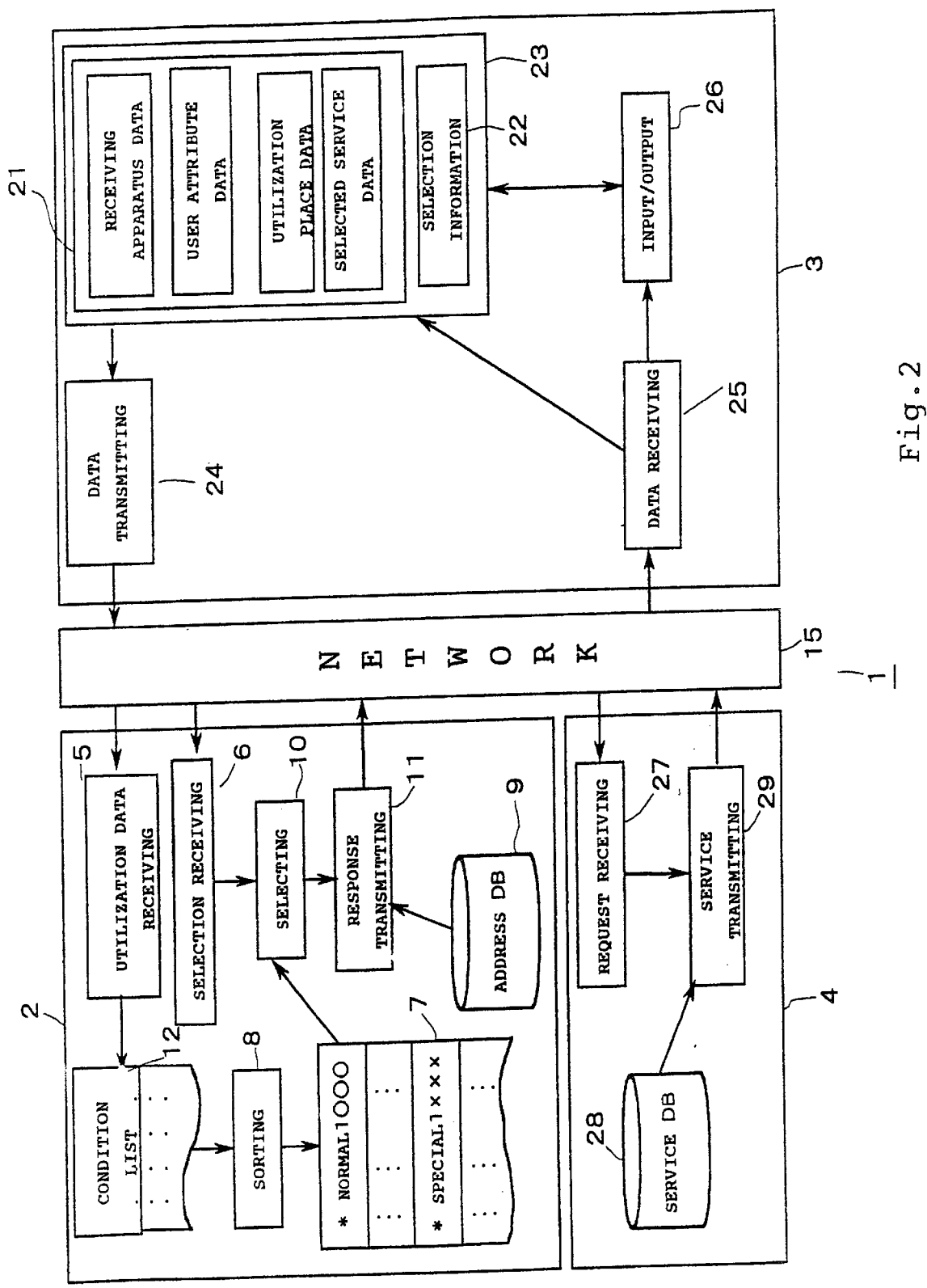
FIG. 2 is a schematic block diagram showing in greater detail the various components of the service providing system and the service providing apparatus in accordance with the present invention.

FIG. 2 is a schematic block diagram for indicating a service providing system containing a service providing apparatus according to one embodiment of the present invention. In the service providing system 1, the service selecting host 2, the user terminal 3, and the provider 4 are connected by way of a network 15. The connection between the user terminal 3, the provider 4 and the service selecting host 2 is accomplished via a computer communications network such as the internet or world wide web. It should be understood that the network 15 could also be, for example, another computer communications network such as a cable TV network.

The service selecting host 2 includes a utilization information receiving unit 5 for receiving the utilization information transmitted from the user terminal 3, a selection information receiving unit 6 for receiving a selection information relating to services that may be provided to the user terminal 3, and a storage unit for storing a condition list 12 and a service correspondence table 7. The condition list 12 contains a received user data set (described in greater detail below). Service utilization information is written into the service correspondence table 7, as is described in greater detail below. The service selecting host 2 further includes a compiling and sorting, unit 8 which regularly updates the contents of the service correspondence table 7, an address database 9 (address DB 9) for recording addresses of various services in correspondence with the respective service names, a selecting unit 10 for selecting a service adapted to the received selection information from the content of the service correspondence table 7, and a response transmitting unit 11 for reading the address of the service selected by the selecting unit 10 from the address DB 9 to transmit the read service address to the user terminal 3.

The user terminal 3 contains a storage unit 23, a data transmitting unit 24, a data receiving unit 25, and an input/output unit 26. The storage unit 23 stores a user data set 21 containing predetermined data and selection information 22 relating to a service such as a specific IRC service. The data transmitting unit 24 transmits the user data set 21 and the selection information 22 to the service selecting host 2. The data receiving unit 25 receives the response sent from the service selecting host 2 and the data sent from the provider 4. The input/output unit 26 displays conversation content from a received service. Although only one user terminal 3 is indicated in FIG. 2, a large number of user terminals are normally connected to the network 15.

The provider 4 contains a request receiving unit 27, a service database (service DB) 28, and a service transmitting unit 29. The request receiving unit 27 receives the request sent from the user terminal 3. In the service DB 28, the services are stored. The service transmitting unit 29 reads out the requested service from the service DB 28, and then transmits this read service to the user terminal 3. In FIG. 2, there is shown only one provider 4. This is an exemplification for showing the existence of the provider. In accordance with the present invention, a plurality of providers are connected to the network 15.

Structure of User Data Set

The user data set 21 stored in the user terminal 3 includes a variety of information, for example, the information may include some or all of the various information described below. The user data set 21 may include: selected service data, receiving apparatus data, user attribute data, and utilization place data. The respective data are previously inputted by, for instance, the user and stored in the user terminal by the input/output unit 26. The selected service data is data indicative of at least one service (i.e. and IRC) which the user has logged onto or may want to log onto via the user terminal 3, and the data includes, for instance, an address where the service is accessed, and the name of the service. The receiving apparatus data is data used to discriminate each of the user terminals 3 within the network 15 by the service selecting host 2, and includes an address (i.e. an internet address) and a telephone number allocated to each of the user terminals connected to the service selecting host

2. The user attribute data is data indicative of, for example, sex, age, occupation, and hobby of the user.

As an example for the purpose of describing the present invention, two sets of user attributes, i.e., "a male in his twenties", and "a single in his thirties" are to possible attributes assumed to be previously inputted and recorded in several user data sets, and classification names (or codes) corresponding thereto are employed as examples of user attribute data. As the utilization place data, for instance, the following detailed information is considered possible for use, an address of a user, a nationality of a user, latitude/longitude obtained from a GPS (Global Positioning System), and a name of a repeater station obtained from the PHS (Personal Handy phone System). In the description of the present invention, a classification of two sets of utilization places "KOBE CITY" and "suburb region" are used as examples, and corresponding classification names thereof are employed as the utilization place data. Other information in addition to the above-listed data may also be included in the user data set 21, if required or desired.

Selection Information

The selection information 22 includes data transmitted from the user terminal 3 to the service selecting host 2 and is derived from the data combinations in the above described user data set. In the embodiment of present invention described herein, the selection information 22 used in the service selecting host 2 and the user terminal 3 is preconfigured as a plurality of sets of selection information which include data combinations based upon the information in user data sets from various individual users. For example, a user or group of users want to be directed to a chat or IRC using the follow designated sets of selection information:

(1) The user(s) desires connection to the most popular selected service, where the popularity is based upon selected service data from subscribing user terminals;

(2) The user(s) desires connection to a service that is both appropriate and popular of all selected services based upon identification of such a selected service by commonality between classification of user's attribute data and selected service data in the user terminals from subscribing user terminals;

(3) The user(s) desires connection to a service that is corresponds to a particular location and is popular of all selected services based upon identification of such a selected service by commonality between the user's utilization place data and selected service data in the user terminals from subscribing user terminals.

Furthermore, in the example described above, as is further described below, special channels 1 to 3 are subsequently identified by the service selecting host 2 where the special channels 1 to 3 correspond to channels provided in IRC. The special channels 1 to 3 correspond to services which were identified as a result of commonality between the various the above-explained selection information in a one-to-one relationship. Specifically, special channel 1 corresponds to the most popular selected service, special channel 2 corresponds to an identified service that is both appropriate and popular, special channel 3 corresponds to a service with a particular location and that is popular. The special channels are described in greater detail below. When one special channel is selected by a user from a user terminal, one of the above-explained selection information (1) to (3) is transmitted to the service selecting host, as is explained further below. The service selecting host 2 compiles and sorts the information on the basis of the respective selection information as described above.

Structure of Service Correspondence Table

In FIG. 3, there is shown a conceptual structural diagram of the service correspondence table 7 indicative of service utilization information.

The service correspondence table 7 includes a transmission subject, a channel number, and a service name. For the purposes of providing an explanation of the present invention, it is now assumed that the service selecting host 2 has selected the most appropriate selected services for accessing from the user terminals based upon the above described selection information.

In FIG. 3, mark "*" indicated in the column labeled Transmission Subject indicates that the corresponding service in that row is designated for use by all of the user terminals which subscribe to the service provided by the service selecting host 2. In other words, no user data set information classifies these services. The service correspondence table 7 depicted in FIG. 3 is only one example of such a table and in the depicted example, only a small amount of services are listed thus reflecting usage of a select number user terminals connected to the network where the services listed were determined based upon user attribute data and utilization place data.

In the column Transmission Subject, the rows having the subject "a male in his early twenties" and "a single in his thirties" each correspond to a service which was identified by sorting compiled information in the condition list 12, where the sorting was effected based upon respective classifications in which user attribute data designated common information.

For example, the row "a male in his early twenties" identifies an IRC or chat room which is most popular with users who have in their user attribute data the information that the user is "a male in his early twenties". Similarly, the row having the Transmission Subjects "KOBE CITY" and "suburb region" correspond to chat room or IRC services that were sorted based upon the popularity of these services with users whose respective classifications in user attribute data and utilization place data had common information and where the utilization place data included information "KOBE CITY" and "suburb region".

Although not shown in FIG. 3, other Transmission Subjects may be identified based upon further combinations of sorted data obtained by searching and sorting combinations of information listed the condition list 12 in which information from the user data sets is compiled. For example, the following transmission subjects may also be identified by searching and sorting for combinations of information from the utilization place data with the user attribute data such as "a male in his early 20s, who lives in KOBE city", and "a single male in his thirties, who lives in a suburb region". In this case, in order to select a service suitable for such a transmission subject, common data is searched for and sorted based upon the information contained in the selection information.

The rows with the listing Normal 1, Normal 2, . . . Normal 5 in the column with the heading Channel Number indicate normal IRC channels (Normal Channels). These normal channels are not sorted, but rather are indications of chat channels or chat rooms readily available on the network 15. Although 5 sets of normal channels are depicted in FIG. 3, hundreds of Normal Channels are usually accessible in IRC over, for instance, the internet. In the normal channels, there is no classification of the normal channels and therefore, all user terminals are designated as the Transmission Subjects as indicated by the "*", and a separate Service Name corresponds to each of the normal channels.

In the Channel Number column, the channels "Special 1" through "Special 3" listed indicate special channels which have been identified by the service selecting host 2. In the example depicted in FIG. 3, the Special 1 channel corresponds a channel that was identified in accordance with the above-explained selection information (1), where by searching and sorting through the data compiled in the condition list 12 from all of the user terminals, the most popular of all selected services has been identified. The two "Special 2" channels were identified by searching and sorting through the compiled data in the condition list 12 to find commonality between the above-described selection information (2), where the service was transmitted to a user terminals whose classifications in the user attribute data included the data identified in the corresponding Transmission Subject column. Similarly, the two "Special 3" channels corresponds to channels identified by searching and sorting through the compiled data in the condition list 12 to find commonality between the above-described selection information (3), where the service was transmitted to a user terminals whose classifications in the utilization place data included the data identified in the corresponding Transmission Subject column.

It should be understood, that each user who logs onto the service selecting host 2 will be provided with a customized list of channels which may be selected for usage. For instance, a user whose user data set designates that the user is, for instance, in his early twenties and is living in Kobe City will be provided with at least the following special channels from the service selecting host 2: Special 1; Special 2 (which is designated in the Transmission Subject column with "a male in his early 20s"); and Special 3 (which is designated in the Transmission Subject column with "KOBE city". Each user is provided with a list of possible services in accordance with the information in their user data set. Further, an example of a list of channels provided from the service selecting host 2 to a user terminal 3 is depicted in FIG. 4 where a plurality of normal channels are listed along with special channels. When such a channel list is displayed on the screen of the user terminal 3, it is possible to display the selection information as the channel name, or display the selection information by transmission subject.

For the sake of simplicity, in the embodiment depicted in FIG. 4, the column of with the heading Channel Name indicates the service contents of various sorts of chats. In an actual case, the addresses used to access the respective services and the service names may be written.

In accordance with the service correspondence table depicted in FIG. 3, a sports chat is transmitted to such a user terminal through which a user selects the SPECIAL-1 channel so as to receive the most popular service. Similarly, a weather forecast chat is transmitted to such a user terminal through which a user who is a male in his early twenties selects the SPECIAL-2 channel so as to receive the most popular service among the users with the same age. And in a case where the user is a single in thirties, the sports chat is transmitted. A similar service transmission is carried out when a user selects the SPECIAL-3 channel. It should be understood that when one of the Normal Channels is selected, she selected service is transmitted from the provider 4, even though the selecting unit 10 did not select the channel for the service receiving apparatus 3. Further, the host 2 still processes the selection of the Normal Channel by the service receiving apparatus 3, updating the condition list 12 using the user data set transmitted from the service receiving apparatus 3, and updating the service utilization list 7, as is described in greater detail below.

Process Flow in Service Providing System

Figure 5:
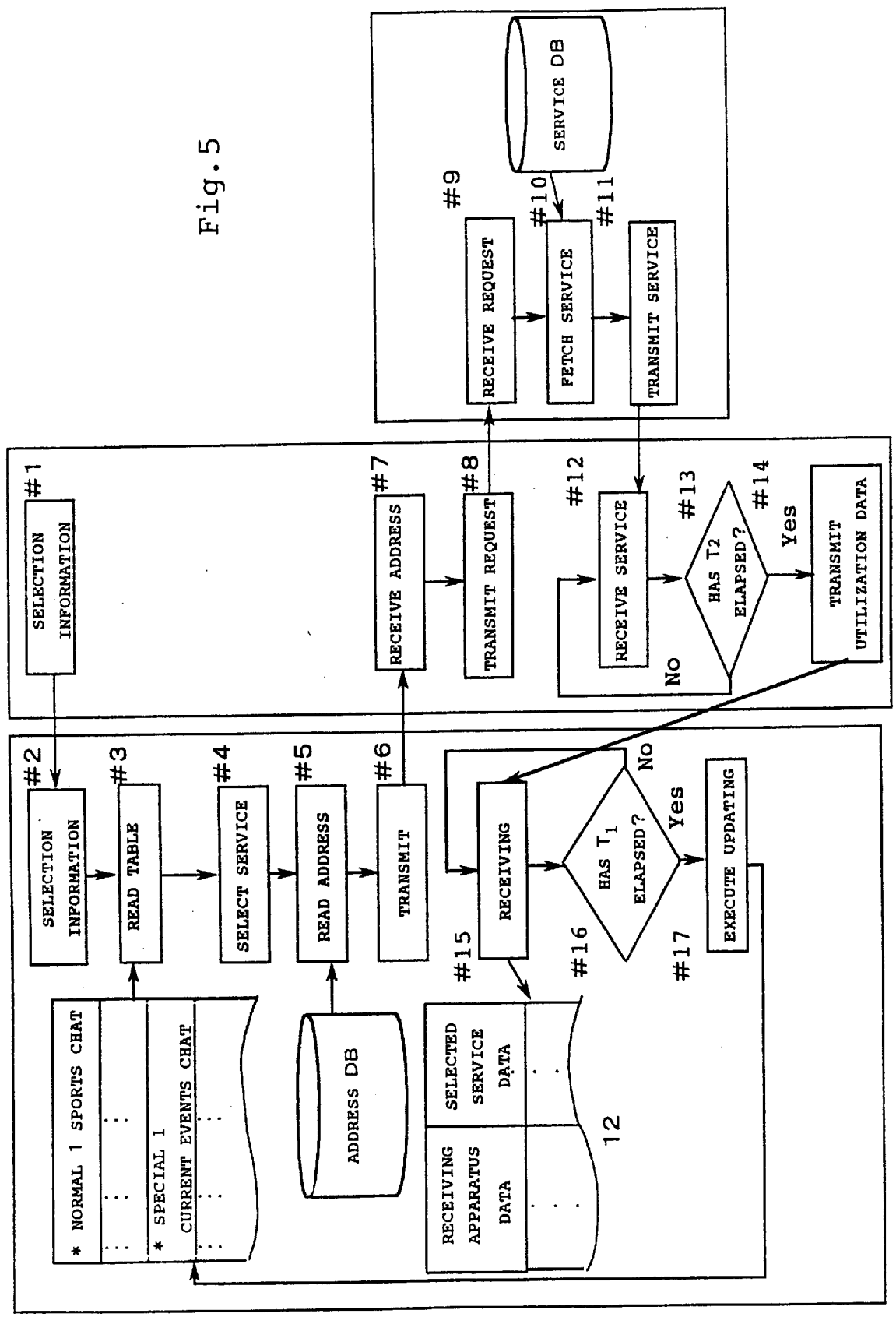
FIG. 5 is a diagram which illustrates a process flow operation executed in the service providing system in accordance with the present invention.

FIG. 5 schematically shows a process flow operation executed in the service providing system 2 according to the above-described embodiment.

First, when a service is selected and entered via the user terminal 3 by a user, the service selection information is transmitted to the service selecting host 2 (#1). In this embodiment, for the sake of easy understanding, it is assumed that the SPECIAL-1 channel shown in FIG. 3 is selected. In this case, the service selection information transmitted to the service selecting host 2 includes information indicating that "the most popular of all selected services of user terminals has been selected".

The service selecting host 2 receives the transmitted selection information (#2), and reads the service correspondence table 7 from the storage unit (#3). The service selecting host 2 selects a service name corresponding to the selection information from the read service correspondence table 7 (#4). In this example, the sports chat corresponding to the SPECIAL-1 channel is selected as the service name.

Subsequently, the service selecting host 2 reads an address of the sports chat from the address DB while using this service name as a key (#5), and then transmits the read address to the user terminal (#6).

Upon receipt of the address of the selected service (#7), the user terminal 3 sends a request to the provider 4 (#8).

The provider 4 which receives the request fetches a service stored at the received address (#10), and then transmits this fetched service to the user terminal 3 (#11).

While receiving the service sent from the provider 4 (#12), the user terminal 3 sends a user data set every predetermined time "T2" (#13) to the service selecting host 2 (#14) so as to update the condition list. The transmitted data is received (#15)

Within a predetermined time "T1" (#17), the service selecting host 2 receives a plurality of user data sets and stores these user data sets into a condition list 12 (#17). It should be noted that in order to store utilization information sent from as many user terminals as possible, the predetermined time "T1" is made sufficiently longer than the time interval "T2" during which the user terminal transmits the utilization information. When the user data sets are stored within the predetermined time T1, the service selecting host 2 compiles the utilization information, sorts, and updates the content of the service correspondence table 7 (#17).

Operation of Service Selecting Host

Referring now to a flow chart shown in FIG. 6, operation of the service selecting host 2 for executing the above-described process operations will be explained.

First, at step S41, the following initialization is carried out, for instance, contents of a buffer used to read the service correspondence table and the addresses of the services are cleared.

Second, at step S42, a determination is made as to whether or not the service selection information has been received from the user terminal 3. If the service selection information is not received, the determination is repeated. When the service selection information is received, the process operation is advanced to step S43. That is, at step S42, the service selecting host 2 waits for the reception of the service selection information. As an example, it is now assumed that selection information corresponding to the SPECIAL-1 channel shown in the service correspondence table of FIG. 3 is received.

At step S43, the service correspondence table 7 is read, and thereafter the process operation is advanced to step S44.

At step S44, a service is identified that corresponds to the received selection information from the service correspondence table 7 to thereby acquire a name of this selected service. In this example, the sports chat is identified as the service name.

At step S45, the address of the selected service, namely, the address of the sports chat in this case is read out from the address DB9, and then the process operation is advanced to step S46.

At step S46, the read address is transmitted to the user terminal from which the selection information has been sent. Thereafter, the process operation is again returned to step S41 at which the service selecting host 2 waits for the reception of the next selection information.

Subsequent to step S41, while the process operations of step S42 to step S46, process operations of step S47 to step S50 is carried out in a parallel manner.

At step S47, a check is made as to whether or not the user data sets are received from a plurality of user terminals provided within the network. If the user data sets are received, then the process operation is advanced to step S48. Conversely, when the user data sets are not received, the process operation is again returned to step S47. That is, at step S47, the service selecting host 2 waits for the transmissions of the user data sets from the user terminal 3.

At step S48, the received user data sets are written into the condition list 12, and then the process operation is advanced to step S49.

At step S49, a check is made as to whether or not the predetermined time T1 has passed. If the predetermined time T1 has elapsed, then it is regarded that a sufficient amount of user data sets have been stored in the condition list 12, and the process operation is advanced to step S50. Conversely, when the predetermined time T1 has not yet passed, the process operation is returned to the previous step S47 in order to further store the user data sets. At step S47, the service selecting host 2 waits for the reception of the user data set.

At step S50, a sorting and updating sub-routine is carried out (as is described below) to rewrite the contents of the service correspondence table 7 by using the user data set stored in the condition list 12. After the rewriting operation is completed, the process operation is returned to step S47 at which the user data set is stored during the predetermined time T1.

Operation of User Terminal

Figure 7:
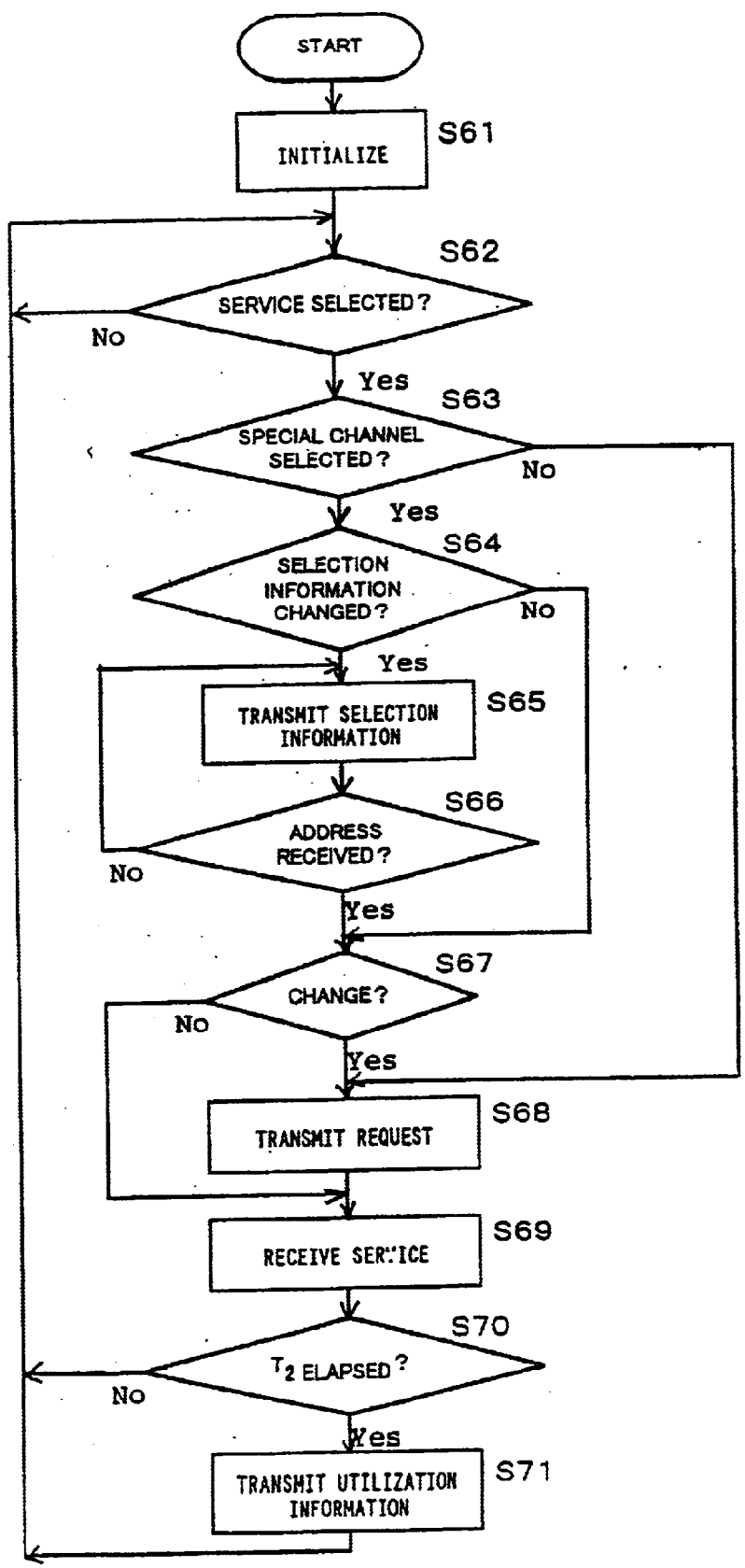
FIG. 7 is a flow chart illustrating a process operation conducted by a user terminal employed in the service providing system depicted in FIG. 5

Referring now to a flow chart shown in FIG. 7, operation of the user terminal 3 for executing the process operations indicated in FIG. 5 will be described.

At step S61, the following initialization operation is carried out, for example, the contents of the buffer used to store the selection information, the address, and the user data set is cleared.

At step S62, a check is made as to whether or not a channel is selected. When the channel is selected, the process operation is advanced to step S63. Conversely, when the channel is not selected, the process operation defined at step S62 is repeated. Since just after the user terminal is connected to the network, the channel is not selected, it is so judged that the channel is not selected. It is now assumed that the SPECIAL-1 channel indicated in the service correspondence table shown in FIG. 3 is selected immediately after the user terminal is connected to the network.

At step S63, a check is made as to whether or not a special channel is selected. If a special channel is selected, then the selection information is recorded and the process operation is advanced to step S64. Conversely if the special channel is not selected, since the normal channel is selected, then the process operation is advanced to step S68 in order to request the provider 4 to provide the service.

At step S64, another check is made as to whether or not the selection information is changed. When the selection information is changed, the process operation is advanced to step S65 so as to select/receive a new service. Conversely, when the selection information has not changed, the process operation is advanced to step S67. In such a case that the channel is selected just after the user terminal is connected to the network, it is so judged that the selection information is changed, and then the process operation is advanced to step S65.

At step S65, the selection information is transmitted to the service selecting host 2. Since the SPECIAL-1 channel is selected, the above-explained selection information (1) "the most popular selected service of all subscribing user terminals" is transmitted as the selection information.

At step S66, a determination is made as to whether or not an address is received from the service selecting host 2. When the address is not received, the process operation is again returned to step S65 at which the selection information is repeatedly transmitted. Conversely, when the address is received, the process operation is advanced to step S67.

At step S67, a determination is made as to whether or not the address of the selected service is changed, namely whether or not the service corresponding to the selection information is changed. If the address has changed, then the process operation is advanced to step S68 in order to receive another service. Conversely, when the address has not changed, since the selectively transmitted services are identical to each other, the process operation is advanced to step S69. It is determined that the address has changed just after the user terminal connected to the network, and then the process operation is advanced to step S69.

At step S68, a request is sent to the provider 4 so as to request a service.

At step S69, the reception of the service from the provider 4 is commenced. Since the service request operation and the service reception operation at step S68 and step S69 are similar to the sequential operation for receiving the normal IRC, a detailed description thereof is omitted.

At step S70, a check is made as to whether or not the predetermined time "T2" has passed after the service is started to be received. If the predetermined time T2 has passed, then the process operation is advanced to step S71. Conversely, when the predetermined time T2 has not yet passed, the process operation is again returned to step S62. At step S62, the determination as to whether or not the selection information is changed by a change in the channel is repeatedly performed.

At step S71, the user data set is sent to the service selecting host 2, and the process operation is again returned to step S62. At step S62, such a check is repeated to determine whether or not the selection information has been changed by entering new information in the service selection information.

In other words, in such a case that the selection information (channel changing) is not changed by the user within the time T2, the process operation is advanced from step S64 to step S67. For instance, when the SPECIAL-1 channel of FIG. 3 remains to be selected, a check is made at step S67 as to whether or not the service of the SPECIAL-1 channel is changed into other chats than the sports chat. If the service of the SPECIAL-1 channel is changed, the replacing service is requested to the provider 4. If not, then the sports chat is continuously received from the provider 4.

Conversely, even when there is a change in the selection information (namely, channel change) by the user within the time T2, if the services are identical to each other, it is so judged at step S67 that there is no change in the address. Thus, the same service is continuously received from the provider.

Sorting and Updating Sub-Routine

Figure 6:
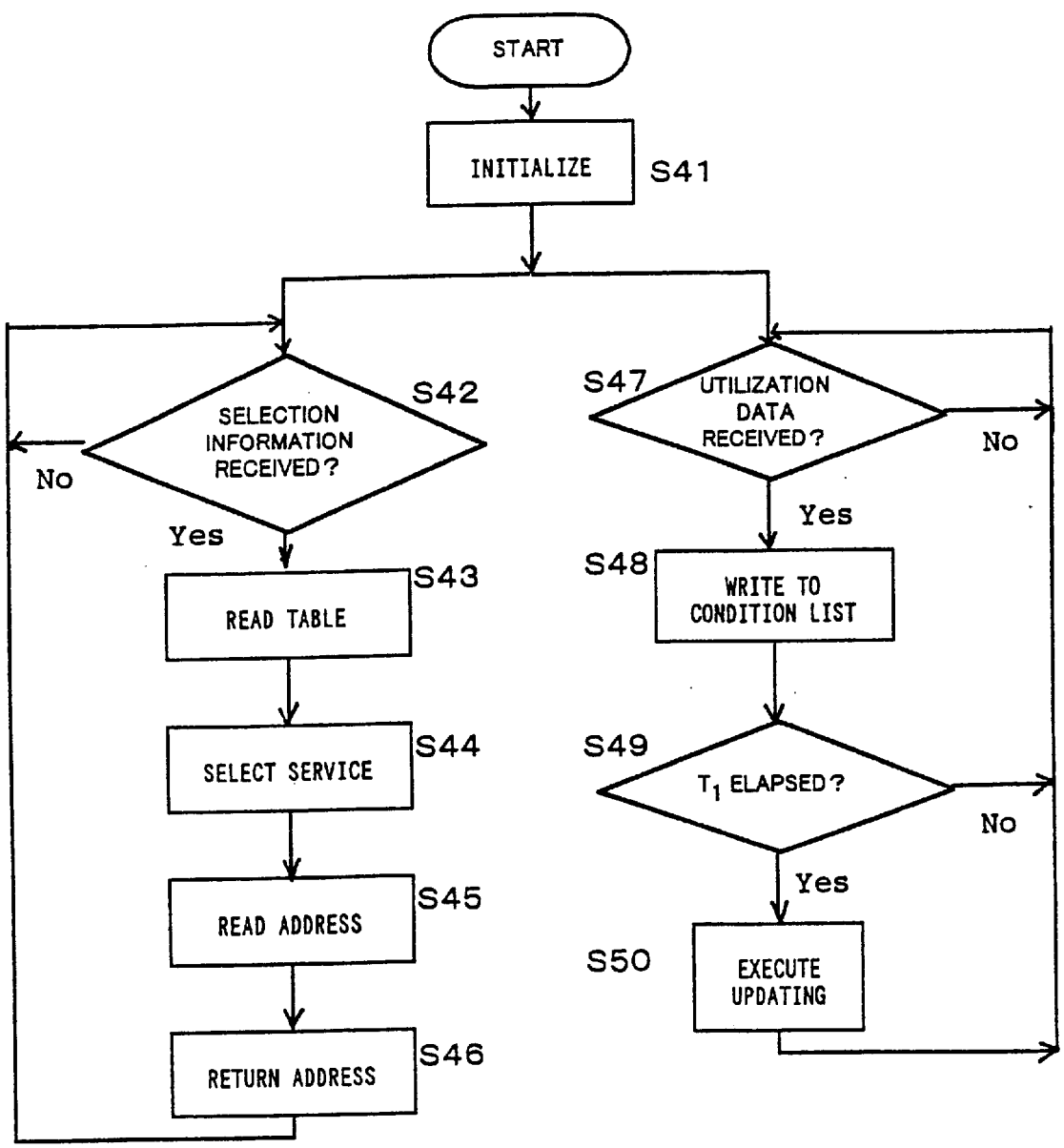
FIG. 6 is a flow chart illustrating a process operation conducted by a service providing host employed in the service providing system depicted in FIG. S.
Figure 8:
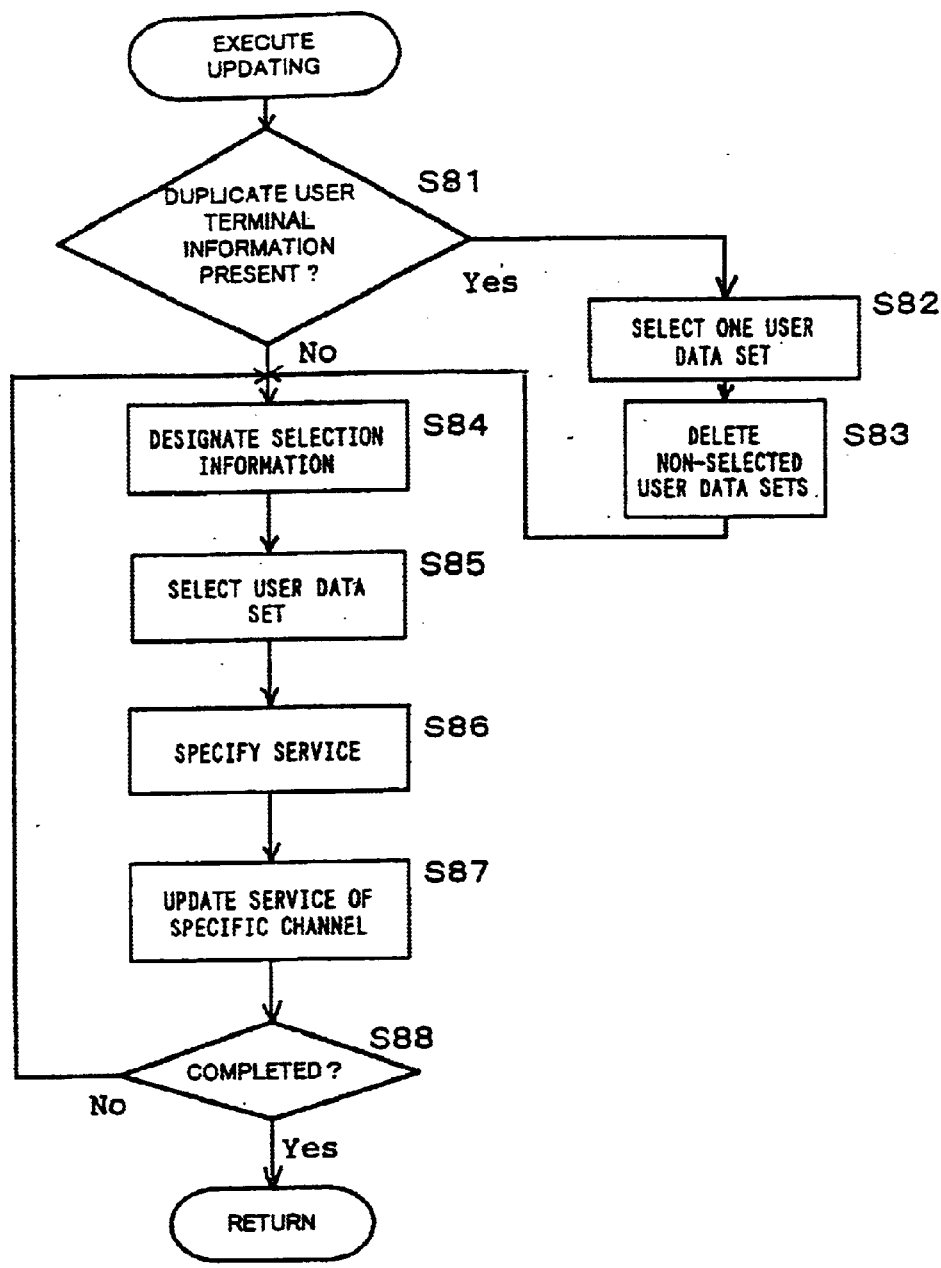
FIG. 8 is a flow chart illustrating a totalizing/rewriting process operation in accordance with the present invention.

In the flow chart shown in FIG. 6, when the service selecting host 2 stores the utilization information and the predetermined time T1 has passed, the sorting and updating sub-routine of FIG. 8 is executed. For the sake of simple explanations, the following description is made of such a case that the service correspondence table 7 indicated in FIG. 3 is updated to produce another service correspondence table shown in FIG. 9.

First, at step S81 shown in FIG. 8, a determination is made as to whether or not a received user data set has previously been recorded in the condition list 12. When it is determined that such a user data set is present, the process operation is advanced to step S82. Conversely, when it is determined that such a user data set is not present, the process operation is advanced to step S84.

At step S82, one user data set is selected from the user data sets having the same receiving apparatus data, and then the process operation is advanced to step S83. There is no specific limitation on how to select one user data set. For example, the latest user data set may be selected.

At step S83, the user data sets having the same receiving apparatus data except for those selected at the former step are deleted from the condition list 12, and the process operation is advanced to step S84.

At step S84, one set of criteria of selection information among all of the preset selection information is set to be updated. In this embodiment, one of the below-mentioned three sets of criteria or combinations of selection information are used as examples of such selection information which are to be updated (the selection information is sorted in order to update the list of services in the list 7):

(1) The most popular selected services in all of the subscribing user terminals.

(2) The most appropriate and popular of all selected services accessed by subscribing user terminals where the most appropriate criteria is based upon a commonality between classification of user's attribute data and selected service data in the user terminals from subscribing user terminals;

(3) The most appropriate selected services in the user terminals where the most appropriate criteria is based upon a commonality between the user's utilization place data and selected service data in subscribing user terminals.

As to each of the above sets of selection information (1) to (3) above, process operations at steps subsequent to step S85 are repeatedly performed until all three sets of selection information are processed and updated data is produced. In other words, steps S84 through steps S88 repeat once for each set of selection information (1) to (3).

In the case that selection information (1) is set in step S84, user data set which has commonality with the selection information is selected. First of all, the user data sets having the same selection service data are grouped, a maximum group is searched in which the total number of user data sets within that group becomes a maximum, and then, one of these user data sets is recognized as a representative user data set. When there are plural maximum groups, any one of these maximum groups may be selected. Also, the representative user data set may be arbitrarily selected from the maximum group. It is now assumed that the selected service of the representative user data set is the NORMAL-1 channel of the normal IRC channel.

Next, at step S86, a service name provided in the same channel as the selected service of the representative user data set is specified with reference to the service correspondence table 7 shown in FIG. 3. In this embodiment, the service name "current event chat" provided in the NORMAL-1 channel is specified.

At step S87, a special channel is specified which corresponds to the selection information from the SPECIAL-1 channel to the SPECIAL-3 channel with reference again to the service correspondence table 7 shown in FIG. 3. In the case of FIG. 3, the special channel in which the user terminals connect to the most is the SPECIAL-1 channel. When the special channel is specified, the service name of the specified special channel is rewritten to the service name of the representative user data set. In this embodiment, the service name "sports chat" of the SPECIAL-1 channel indicated in FIG. 3 is rewritten or updated to the service name "current event chat" shown in FIG. 9.

At step S88, a check is made as to whether or not the services are have been searched and sorted as to all of the totalization conditions (1) to (3). If the services are not yet searched and sorted, then the process operation is returned to step S84. At step S84, the next totalization condition is determined. If the services are searched and sorted with respect to all of the totalization conditions, then it is regarded that the updating operation of the service correspondence table 7 is accomplished, and thus the process operation is returned to the main routine shown in FIG. 6.

When the selection information (2) is set at step S85, the user data sets having the same selected service data and the same user attributes are respectively grouped, a representative user data set is determined in a similar manner to the above-described. Similar to the above description, when there are plural maximum groups, any one of these maximum groups may be selected. Also, the representative user data set may be arbitrarily selected from the maximum groups.

Now, considering the case, when a plurality of classifications are set as the user attribute data, a representative user data set is selected from each of these classifications. In this embodiment, a representative user data set is selected from each of the two classifications of the user attribute data, i.e., "a male in his early twenties", and "a single in the thirties". It is now assumed that as one example, the selected service of the representative user data set corresponds to the NORMAL-5 channel of the normal IRC channel, and the user attribute data corresponds to "a male in his early twenties".

Next, at step S86, a service name provided in the selected channel of the representative user data set is specified with reference to the service correspondence table 7 in a similar manner to the above explanation. In this case, the service name "movies chat" is provided in the NORMAL-5 channel.

At step S87 similar to the above explanation, with reference again to the service correspondence table 7, a special channel is selected based upon the criteria contained in the representative user data. The service name of this specific channel is rewritten to the specified service name. In this embodiment, the service name "weather forecast chat" of the SPECIAL-3 channel indicated in FIG. 3 is rewritten to the service name "movies chat" shown in FIG. 9. In the SPECIAL-3 channel, "suburb region" is a subject to be transmitted.

It should be noted that in the selection information (3), when a plurality of classifications are present in the utilization place data, the process operations of step S84 to step S88 may be repeatedly performed in order to sort the services in correspondence with the respective classifications inherent in the data.

Other Embodiments

The present invention is not limited to the above described embodiments, but may be modified as follows:

(a) In the updating process operation executed in the above-explained embodiment, the most appropriate selected services by the largest number of user terminals are sorted, updated and selected from the services which may satisfy the selection information. Alternatively, the least selected services by the user terminals may be sorted and selected. In this case, since the least accessed services is selected by a user, the access time to the service may be shortened and the service may be received in comfortable conditions.

(b) The above embodiments have described the services on the IRC. However, the present invention is not limited to these services. If any other services are provided via a network, for instance, a broadcasting program provided by a CATV, and another broadcasting program provided by an interactive broadcasting system which is expected to realize in the future, then these services may be applied to the present invention irrespective of the service modes.

(c) In the case that a special channel is selected, a normal channel for providing the channel may be stored, and may be displayed on a screen. Even when a service presently provided on a specific channel is changed, since the received service history is stored as a channel, the service which has been just provided could be quickly recalled on a screen.

(d) In the above-explained embodiments, the service can be received when the user data set of the user terminal is made coincident with the transmission subject of the service correspondence table. The present invention is not limited to the above embodiments. For example, in such a user terminal having "a in his early twenties" as the classification of the user attribute, and having "KOBE CITY" as the classification of the utilization place, it is alternatively possible to select cervices which are sorted based upon the classification of another user attribute and that of another utilization place.

In accordance with the present invention, even when a large number of services are provided, the services suitable to the respective users are properly selected to be transmitted to the respective users. As a consequence, these users can avoid such a cumbersome selecting of services, and furthermore can readily receive all of the properly selected services.

Various details of the invention may be changed without departing from its spirit nor its scope.

Furthermore, the foregoing description of the embodiments according to the present invention is provided for the purpose of illustration only, and not for the purpose of limiting the invention as defined by the appended claims and their equivalents.

What is claimed is:

1. A receiving apparatus for connection to an information service and at least one of a plurality of separate services, wherein said information service provides information about said plurality of separate services, said information service including a host for providing said information service in response to a request from said receiving apparatus, wherein a plurality of said receiving apparatuses are connected to said host via a communication network, said receiving apparatus comprising:

a channel list memory for storing a channel list including one or more normal channels related to a predetermined separate service, and one or more special channels related to selection information;

display means for displaying the channel list;

selecting means for selecting channels displayed on the channel list;

first request means for requesting the separate service related to a selected normal channel according to a selection of the normal channel;

second request means for requesting the separate service related to selection information according to a selection of the special channel;

storage means for storing said selection information and a user data set containing selected separate service data;

transmission means for transmitting said user data set and said selection information to said host at a predetermined time interval and for transmitting a request at a predetermined time interval to said host for channel list updated by user data sets sent from the plurality of receiving apparatuses to said host; and reception means for receiving from said host, a channel list related to said information service which is selected according to a summary of selection information and user data sets transmitted from said plurality of receiving apparatuses.

2. The receiving apparatus as set forth in claim 1, wherein;

said storage means is configured to store service selection information identifying at least one of said separate services accessed by said receiving apparatus; and said receiving apparatus includes the display means for displaying said service selection information stored in said storage means.

3. A receiving apparatus for connection to an information service and at least one of a plurality of separate services, wherein said information service provides information about said plurality of separate services, said information service including a host for providing said information service in response to a request from said receiving apparatus, wherein a plurality of said receiving apparatuses are connected to said host via a communication network, said receiving apparatus comprising:

a channel list memory to store a channel list including one or more normal channels related to a predetermined separate service, and one or more special channels related to selection information;

a display device to display the channel list;

a selecting device to select channels displayed on the channel list;

a first request device to request the separate service related to a selected normal channel according to a selection of the normal channel;

a second request device to request the separate service related to selection information according to a selection of the special channel;

a storage device to store said selection information and a user data set containing selected separate service data;

a transmitting device to transmit said user data set and said selection information to said host at a predetermined time interval and to transmit a request at a predetermined time interval to said host for a channel list updated by user data sets sent from the plurality of receiving apparatuses to said host; and a receiving device to receive from said host, a channel list related to said information service which is selected according to a summary of selection information and user data sets transmitted from said plurality of receiving apparatuses.

4. The receiving apparatus as set forth in claim 3, wherein, said storage device is configured to store service selection information identifying at least one of said separate services accessed by said receiving apparatus.

5. The receiving apparatus as set forth in claim 4, wherein the display device displays said service selection information stored in said storage device.

* * * * *

UNITED STATES PATENT AND TRADEMARK OFFICE
CERTIFICATE OF CORRECTION

PATENT NO. : 6,751,656 B2
DATED : May 15, 2004
INVENTOR(S) : Youji Kohda et al.

It is certified that error appears in the above-identified patent and that said Letters Patent is hereby corrected as shown below:

Column 19,
Line 22, change ";" to -- : --.

Signed and Sealed this

Twenty-first Day of September, 2004

JON W. DUDAS
*Director of the United States Patent and Trademark Office*